(12) United States Patent
    Bamford

(10) Patent No.: US 12,598,356 B2
(45) Date of Patent: Apr. 7, 2026

(54) SYSTEM AND METHOD FOR ANALYZING VIDEOS

(71) Applicant: Viktrs Ltd, London (GB)

(72) Inventor: Mark Bamford, London (GB)

(73) Assignee: Viktrs Ltd, London (GB)

( * ) Notice: Subject to any disclaimer, the term of this patent is extended or adjusted under 35 U.S.C. 154(b) by 0 days.

(21) Appl. No.: 17/325,919

(22) Filed: May 20, 2021

(65) Prior Publication Data

US 2021/0373722 A1    Dec. 2, 2021

Related U.S. Application Data

(60) Provisional application No. 63/029,892, filed on May 26, 2020.

(51) Int. Cl.

| | |
|---|---|
| *H04N 21/478* | (2011.01) |
| *G06F 3/0482* | (2013.01) |
| *G06F 3/0485* | (2022.01) |
| *G06F 16/74* | (2019.01) |
| *G06Q 10/02* | (2012.01) |
| *G06Q 20/04* | (2012.01) |
| *G06Q 30/0601* | (2023.01) |

(Continued)

(52) U.S. Cl.
    CPC ..... *H04N 21/47815* (2013.01); *G06F 3/0482* (2013.01); *G06F 3/0485* (2013.01); *G06F 16/74* (2019.01); *G06Q 10/02* (2013.01); *G06Q 20/045* (2013.01); *G06Q 30/0623* (2013.01); *G06Q 30/0643* (2013.01); *H04N 21/4316* (2013.01); *H04N 21/4725* (2013.01); *G06F 2203/04803* (2013.01)

(58) Field of Classification Search
    CPC ......... H04N 21/47815; H04N 21/4725; H04N 21/4316; G06F 3/0482; G06F 3/0485; G06F 16/74; G06F 2203/04803; G06Q 10/02; G06Q 20/045; G06Q 30/0643; G06Q 30/0623
    See application file for complete search history.

(56) References Cited

U.S. PATENT DOCUMENTS

| | | | |
|---|---|---|---|
| 6,711,552 B1 * | 3/2004 | Kay | H04N 21/274 |
| | | | 348/E7.071 |
| 7,110,714 B1 * | 9/2006 | Kay | H04H 60/64 |
| | | | 725/136 |

(Continued)

FOREIGN PATENT DOCUMENTS

WO        WO-0165832 A1 *  9/2001  ......... H04N 21/8547

*Primary Examiner* — Justin R. Blaufeld
(74) *Attorney, Agent, or Firm* — IP Attorneys Group, LLC

(57)                ABSTRACT

The present invention relates to a system and method for analyzing videos. The system comprises a video section and a tabs section, wherein the video section comprises a video and the tabs section comprises at least one tab with items or information related to the video. In most embodiments one of the tabs is a products tab which lists items in the video which can be purchased. These items are associated with specific time points in the video, generally when the item is visible in the video. When a user watches the video, the individual products will be highlighted as their time points are viewed. The user can additionally scroll through the list of products without effecting video playback. The method comprises the gathering and uploading of information associated with the video.

19 Claims, 14 Drawing Sheets

(51) Int. Cl.
    *H04N 21/431*     (2011.01)
    *H04N 21/4725*     (2011.01)

(56)            References Cited

U.S. PATENT DOCUMENTS

| | | | | |
|---|---|---|---|---|
| 8,255,293 | B1 * | 8/2012 | Davies | G06Q 30/0251 |
| | | | | 705/14.72 |
| 8,281,332 | B2 * | 10/2012 | Rajaraman | G06Q 30/02 |
| | | | | 725/32 |
| 8,397,153 | B1 * | 3/2013 | Lee | G06F 40/14 |
| | | | | 715/204 |
| 8,458,053 | B1 * | 6/2013 | Buron | H04N 21/4316 |
| | | | | 705/26.1 |
| 9,785,974 | B1 * | 10/2017 | Periasamy | G06Q 30/0267 |
| 2003/0200159 | A1 * | 10/2003 | Kay | H04N 21/4312 |
| | | | | 348/E7.071 |
| 2003/0234819 | A1 * | 12/2003 | Daly | H04N 21/2143 |
| | | | | 715/810 |
| 2006/0085735 | A1 * | 4/2006 | Shimizu | G06F 40/169 |
| | | | | 715/201 |
| 2006/0259930 | A1 * | 11/2006 | Rothschild | G11B 27/11 |
| | | | | 348/E7.071 |
| 2007/0130539 | A1 * | 6/2007 | Yamagishi | H04N 21/47 |
| | | | | 348/E5.112 |
| 2007/0250775 | A1 * | 10/2007 | Marsico | H04N 21/235 |
| | | | | 707/E17.119 |
| 2008/0276272 | A1 * | 11/2008 | Rajaraman | G06Q 30/02 |
| | | | | 725/37 |
| 2009/0006208 | A1 * | 1/2009 | Grewal | G06Q 30/02 |
| | | | | 705/14.61 |
| 2009/0007023 | A1 * | 1/2009 | Sundstrom | G06F 3/04812 |
| | | | | 715/858 |
| 2009/0144772 | A1 * | 6/2009 | Fink | G06Q 40/08 |
| | | | | 725/42 |
| 2009/0172744 | A1 * | 7/2009 | Rothschild | H04N 21/8133 |
| | | | | 725/60 |
| 2009/0276805 | A1 * | 11/2009 | Andrews, II | G06Q 30/02 |
| | | | | 725/38 |
| 2009/0297118 | A1 * | 12/2009 | Fink | H04N 21/8583 |
| | | | | 463/31 |
| 2009/0300475 | A1 * | 12/2009 | Fink | H04N 21/4781 |
| | | | | 726/4 |
| 2010/0111360 | A1 * | 5/2010 | Sigal | H04N 21/4223 |
| | | | | 705/26.1 |
| 2010/0162303 | A1 * | 6/2010 | Cassanova | H04N 5/45 |
| | | | | 725/115 |
| 2010/0274673 | A1 * | 10/2010 | Isaac | H04N 21/8113 |
| | | | | 707/E17.069 |
| 2010/0293190 | A1 * | 11/2010 | Kaiser | H04N 21/854 |
| | | | | 707/769 |
| 2011/0113444 | A1 * | 5/2011 | Popovich | G11B 27/034 |
| | | | | 725/32 |
| 2011/0162002 | A1 * | 6/2011 | Jones | G06Q 30/0241 |
| | | | | 725/32 |
| 2011/0231260 | A1 * | 9/2011 | Price | G06Q 30/0264 |
| | | | | 707/E17.014 |
| 2011/0282906 | A1 * | 11/2011 | Wong | G06F 16/7837 |
| | | | | 707/E17.03 |
| 2011/0302613 | A1 * | 12/2011 | Joshi | H04N 21/6582 |
| | | | | 725/60 |
| 2012/0128241 | A1 * | 5/2012 | Jung | H04N 21/435 |
| | | | | 382/165 |
| 2012/0167145 | A1 * | 6/2012 | Incorvia | H04N 21/47815 |
| | | | | 725/60 |
| 2012/0167146 | A1 * | 6/2012 | Incorvia | H04N 21/234318 |
| | | | | 725/60 |
| 2012/0174173 | A1 * | 7/2012 | Brood | H04N 21/4316 |
| | | | | 725/110 |
| 2012/0304065 | A1 * | 11/2012 | Cai | G06F 16/748 |
| | | | | 715/719 |
| 2013/0036355 | A1 * | 2/2013 | Barton | H04N 21/8586 |
| | | | | 715/719 |
| 2013/0117129 | A1 * | 5/2013 | Brown | G06Q 30/02 |
| | | | | 705/14.66 |
| 2013/0182182 | A1 * | 7/2013 | Mountain | H04N 21/4728 |
| | | | | 348/E5.103 |
| 2013/0339857 | A1 * | 12/2013 | Garcia Bailo | H04N 21/8583 |
| | | | | 715/723 |
| 2014/0047483 | A1 * | 2/2014 | Fairbanks | G06Q 30/0241 |
| | | | | 725/60 |
| 2015/0120767 | A1 * | 4/2015 | Skeen | H04N 21/4725 |
| | | | | 707/754 |
| 2016/0149841 | A1 * | 5/2016 | Lewis | H04L 51/212 |
| | | | | 715/752 |
| 2016/0205431 | A1 * | 7/2016 | Avedissian | H04N 21/812 |
| | | | | 725/37 |
| 2017/0017382 | A1 * | 1/2017 | Tobin | H04N 21/44226 |
| 2018/0152764 | A1 * | 5/2018 | Taylor | G06Q 30/0623 |

* cited by examiner

20

51

SYSTEM AND METHOD FOR ANALYZING VIDEOS

This application claims priority to and the benefit of U.S. Provisional Patent Application No. 63/029,892, filed May 26, 2020 and titled "System and Method for Analyzing Videos." The contents of the above-identified Application are relied upon and incorporated herein by reference in its entirety.

BACKGROUND OF THE INVENTION

The present invention relates to a system and method for analyzing videos.

Billions of videos are watched by individuals every day. Often, these individuals are interested in the products, locations, people, or other items related to the video. However, current video watching systems and methods do not give the ability to inquire about or search for this information. Because of this, users often have to search for this information on their own, which could open them up to counterfeit products or information, or simply cannot access the information in which they are interested. The companies which produce videos, sell items found in videos, or have businesses located where the video was shot are potentially missing out on consumers who are interested in their products. Similarly, artists cannot typically share information regarding the inspirations of the videos, others involved in the production or writing of a video, or other information which they may want to convey to individuals watching the videos. Thus, what is needed is a system or process which analyzes videos and allows individuals to interact with the items and other information related to the video.

When a user is watching a video, usually they do not want the experience of video watching to be interrupted with ads or other features. Ideally then, the system and method for analyzing videos should allow a user to view the information related to the video without interrupting or blocking the video watching experience.

SUMMARY OF THE INVENTION

The present invention relates to a system and method for analyzing videos. Generally, the system is an application which is operated by or used by the application owner and one or more users, and the method is the process by which the video is uploaded to and viewed through the application.

In some embodiments the system comprises an application with a video section and a tabs section. In these embodiments the video section comprises at least one video with a plurality of time points and the tabs section comprises at least one tab with at least one item. In most embodiments a time point is active when the video is at the time point when playing or when a user is watching the video. In these embodiments one or more of the items in tabs are associated with time points such that when a user watches the video or the video plays, the item becomes highlighted when the time point is active.

In some embodiments the tabs section comprises multiple tabs, each which comprise at least one item. In some items the tabs are different categories, which are selected from the group consisting of products, people, music, gigs, inspirations, charities, and combinations thereof. In some embodiments the application comprises multiple video sections and tabs sections, where each video section comprises a unique video and is paired with a matching tabs section.

In some embodiments the tabs section further comprises the tabs consisting of people tab, which comprises one or more individuals involved in the creation of the video, gigs and music tab, which comprises the ability to purchase music by the artist and purchase tickets for upcoming concerts by said artist, inspiration tab, which comprises inspirations or other details about the video, and combinations thereof.

In some embodiments user is able to scroll through the items and engage with the items while the video is playing. In some embodiments the user is able to click on an item which displays additional information about the item in the tabs section as well as a link to a website where the user could purchase said item.

In some embodiments the application is embedded in a website, in others the application is an application which is on a phone or tablet, and in other embodiments the application is other digital manifestations of the invention.

In some embodiments one of the tabs is a product tabs which has one or more products. In some of these embodiments the products each further comprise a price, an image, a title, and a brand name. In some of these embodiments the products each further comprise a description and a website which sells said item and which are viewed when a user engages with said at least on product in said products tab.

In some embodiments the owner of the application obtains contracts with the companies or individuals who sell the products and the owner of the application obtains a portion of the sales revenue which comes from the sale of the products through the application.

In many embodiments the method for organizing videos comprises the steps of obtaining a video, obtaining information on at least one item in the video which is available for purchase, associating a time point in the video with the at least one item, displaying the video and at least one tab which contain information about the video, displaying the at least one item in one of the at least one tabs, and highlighting the at least one item when the time point in the video is viewed by a user.

In some embodiments the step of obtaining information on the at least one item comprises the steps of obtaining a web link where the item is sold, obtaining a name for the item, obtaining a brand name of a company which sells the item, obtaining a price for the item, obtaining an image of the item, and obtaining a description of the item, associating the web link, the name, the brand name, the price, the description, and the image of the item with the item.

In some embodiments of displaying the at least one item comprises displaying the name, the brand name, the price, and the image of the item. In some embodiments the step of displaying additional information about the item when a user engages with the item, and which comprises displaying the name, the brand name, the price, the description, and the image of the item. In some of these embodiments the video is not stopped from playing when information is displayed.

In some embodiments the method further comprises the step of displaying a button which when engaged by the user opens up the web link where the item is sold.

In some embodiments the method further comprises the step of obtaining one or more websites associated with at least one individual involved in the creation of the video and associating the one or more websites with the video.

In some embodiments the method further comprises the step of obtaining information about upcoming events hosted by at least one individual involved in the creation of the video and associating the information about upcoming events with the video.

DETAILED DESCRIPTION OF THE INVENTION

Figure 1:
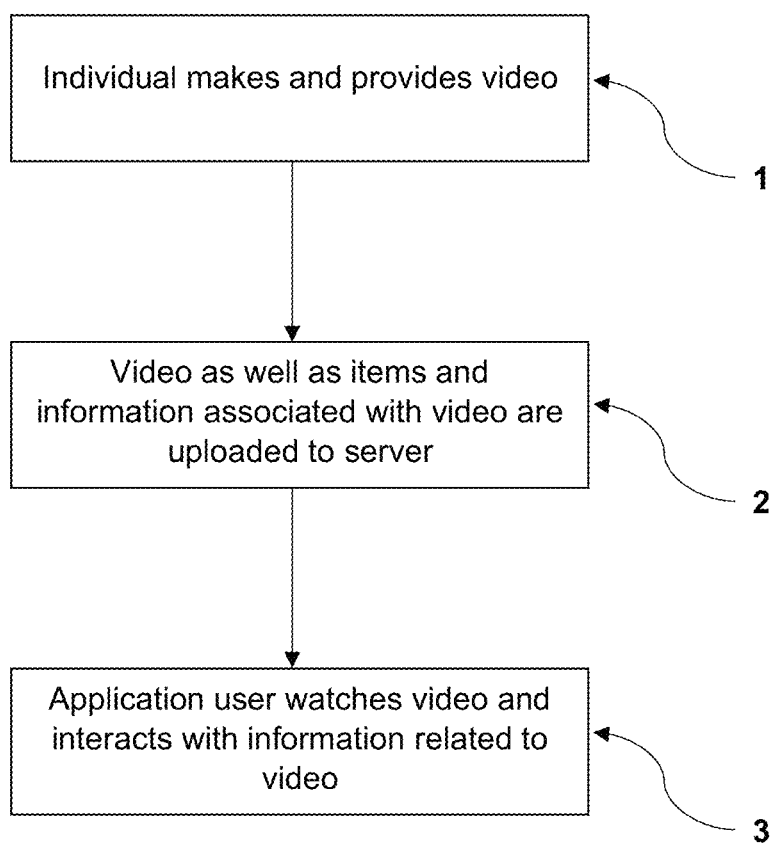
FIG. 1 shows an overall view of the method for analyzing videos.

The present invention relates to a system and method for analyzing videos. The system generally comprises a video, at least one product or set of information related to the video, a data server which stores and correlates the products, information, and video, and an application on a computer, phone, tablet, or other similar device. FIG. 1 shows the overall method, where first an artist or producer (66) will make a video and send it to the application owner. Second, the information related to the video, whether provided by the artist or producer or found by the application owner, is uploaded to the server (63) along with the video itself. Third, users of the application (65) can view the video and engage with the information associated with the video. Each of these steps will be discussed in more detail below. In this patent, the term application refers so any digital manifestation of the invention. In some embodiments the application is a website or embedded in a website, in others the application is a cellular or tablet application which is downloaded onto the device and used independently of a website.

Figure 13:
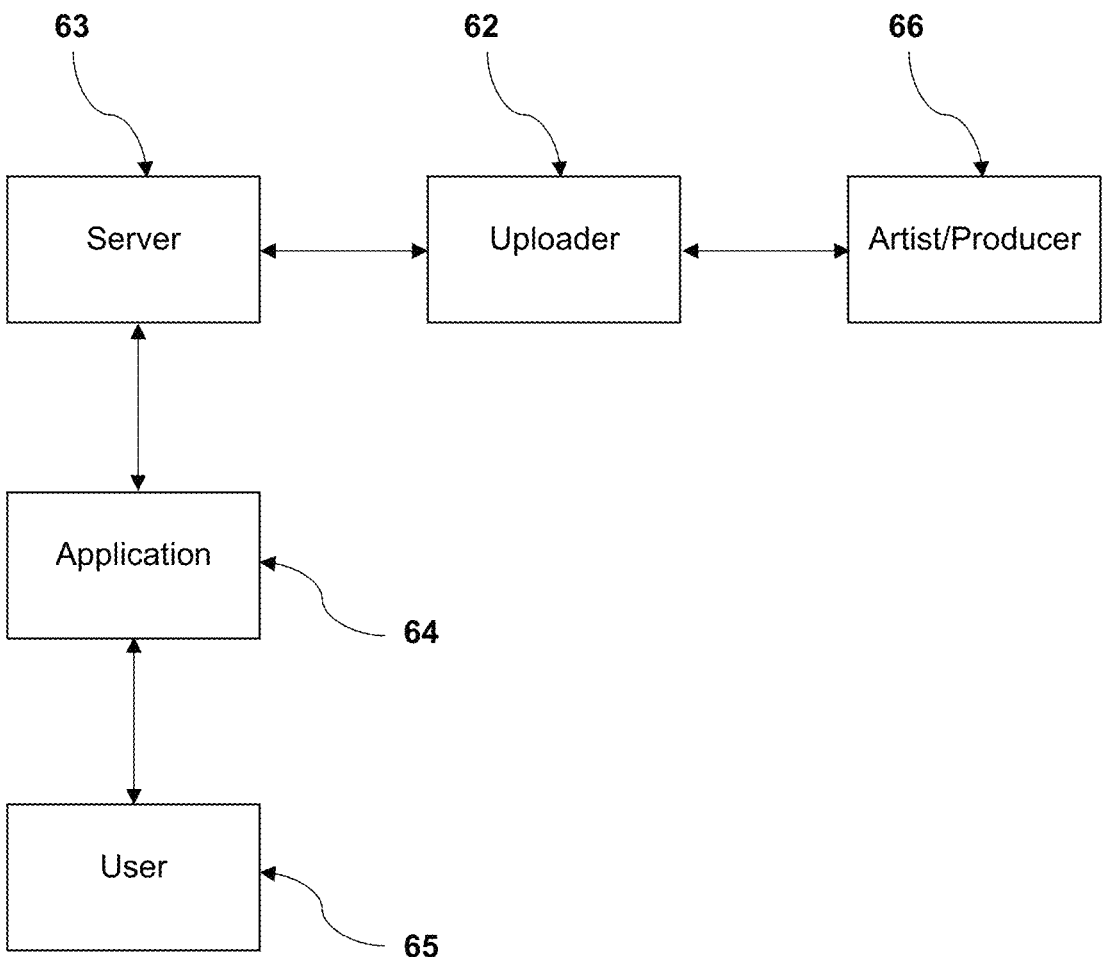
FIG. 13 shows an interaction flow chart for the system for analyzing videos, which is made by the method shown in FIG. 1.

In most embodiments the system comprises the developed application (64), the owner of the application, at least one artist (66), at least one user (65), and at least one seller. In most embodiments, the owner is the corporation who has rights to the application, and includes all individuals working at the corporation. In some embodiments, individuals working at the corporation includes sub-contractors or other individuals associated with the company. In some embodiments, the owner is a single individual, and in other embodiments the owner is a group of individuals. The different interactions between the individuals involved in the application and the application itself are shown in FIG. 13. In general, the artist or producer (66) provides the video to the uploader (62) who uploads the video and information to the server (63). The server communicates with the application (64), and application 64 in turn communicates and engages with user 65.

In most embodiments, the first step of the method for analyzing videos (1) is an artist, producer, or other individual making a video and sending that video to the owner of the application. The content of the video is not limited, except in some embodiments by what is legal in different jurisdictions. Some examples of video content include music videos, instructional "how-to" videos, reviews, movies, talk show clips, news clips, comedy sketches, or stand-up routines. Many example embodiments discussed in this application will focus on music videos, however, this is not intended to limit the types of videos which are used in this system and method.

In most embodiments, the video which is created by the artist or producer has items and information associated with it. This information and items include, but is not limited to, products in the video, location of the video, individuals in the video, individuals who helped produce the video, upcoming concerts for the artists in the video, and charities which the individuals associated with the video are supporting. In some embodiments, the information is provided to the owner of the application by the artist or producer, and in other embodiments, the information must be obtained by the owner of the application.

Step 2 of the general method (2) comprises uploading the video and information about the video to the server. In some embodiments, this step is completed by the artist or the producer and in other embodiments this step is completed by the owner of the application. For the sake of this patent application, the term "the uploader" will refer to the individual or group of individuals who completes this step.

In most embodiments, the video and information is added to a server and the information stored before uploaded onto the application itself. This beneficially allows for testing of the video environment and the associations of the video and the information related to the video, as well as allows the owner to safely store and backup the video data and information.

In some embodiments the video is uploaded to the application from the server using a third-party system for video playing and hosting, such as Flowplayer, and in other embodiments the video is uploaded to a system designed and operated by the owner of the application. In most embodiments, the video is embedded using an inline frame (or iframe). Additionally, in most embodiments, tabs showing different categories are embedded in a second iframe. In some embodiments the tabs showing different categories are embedded in different section of the iframe where the video is embedded.

In most embodiments, there are different categories for the information associated with the video. While not intending to be a limiting list, the different categories are selected from the list comprising products, merchandise, teams, brands, people, gigs, music, charities, causes, fan videos, parody videos, response videos, community, similar artists or videos, inspirations, tickets, designers, models, social media, parents, students, teachers, administrators, donations, further resources, travel agencies, locations, actors, and combinations thereof. In some embodiments, one or more categories are combined and in others they are separate. As can be seen, there are a variety of different grouping or ways to group information related to the video, which in some embodiments will be different for the different types of videos. For example, a music video may have categories consisting of "products", which lists items in the music video, "people", which includes individuals involved in the creation of the video, "gigs and music", which shows upcoming concerts or albums one can attend and purchase, and "inspirations and charities," which discusses inspirations behind the song and charities which the artist or producer is involved in which a user could donate. In contrast to this, an educational video may have categories consisting of "further recourses" for the students to get additional information, "teachers" where other instructors can get materials or information related to teaching the topic, "similar videos" which lists other videos covering the same or a related topic, and "people" where a user can see information related to the individuals involved in the creation of the video.

In some embodiments the categories are dependent on the type of video, and in other embodiments the categories are the same no matter what the type or content of the video. Embodiments where there are different categories for the different video types are useful as the categories can be optimized to suit that specific video type. For example, in most embodiments one would not need a tab for teacher resources in a generic music video. Embodiments where the categories are the same no matter what the video type are useful as they give a more standardized experience, and can help videos which may span various categories. For example, an educational music video may in fact want a "teachers" category while also wanting categories that would be assigned to standard music videos. In some embodiments the uploader can choose multiple video types and thus have access to different categories, and in other embodiments, the uploader can select the categories for the specific uploaded video, which beneficially allows diverse information to be associated with the video.

In some embodiments where the uploader is different from the artist or producer of the video, only the information provided by the artist or producer is uploaded and associated with the video. In other embodiments, the uploader will search for and add information in addition to the information provided by the artist or producer. In some embodiments, the uploader will verify all information provided by the artist or producer, and in others the information will be uploaded without verification.

Figure 2:
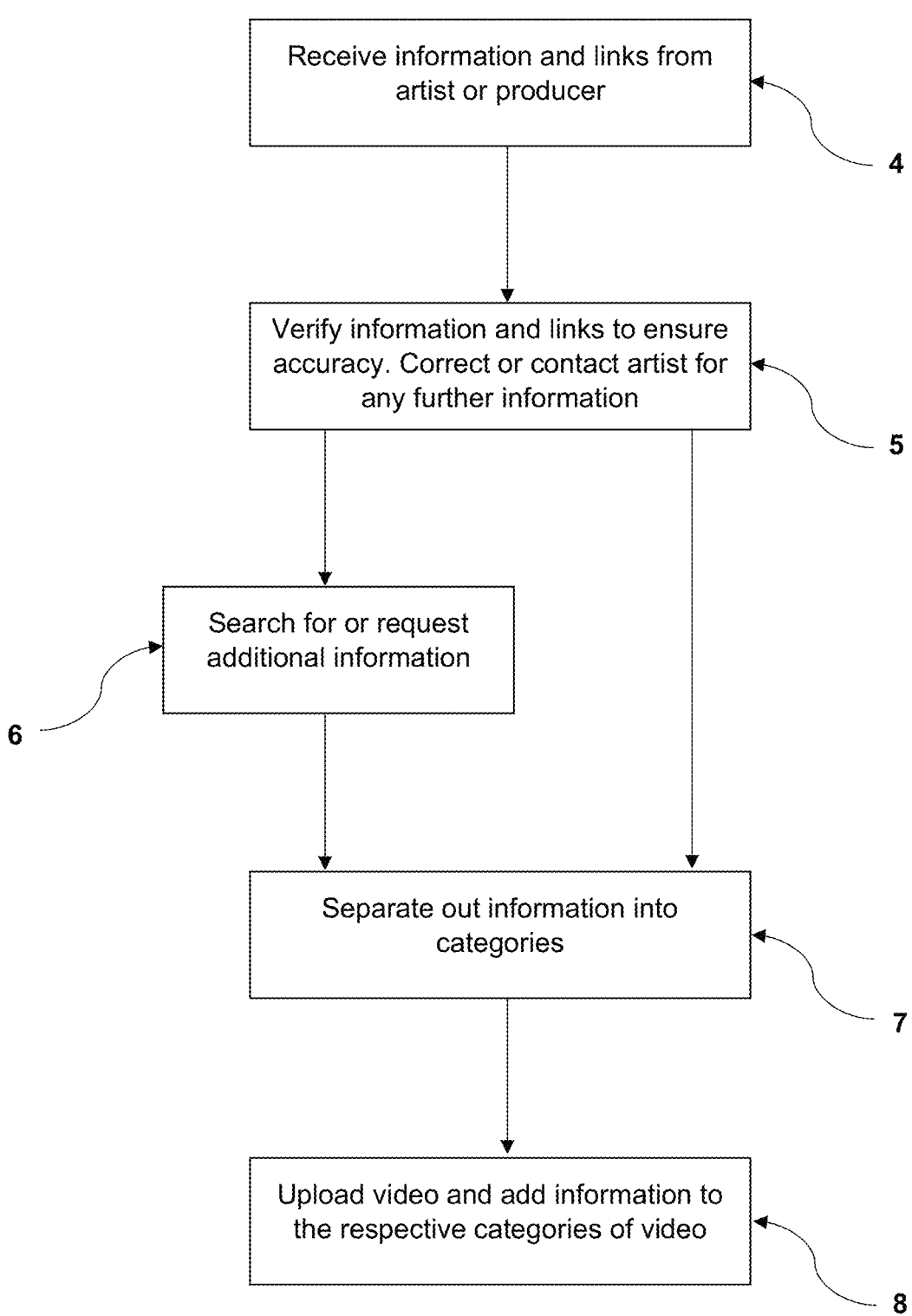
FIG. 2 shows a more detailed view of the second step of the method for analyzing videos shown in FIG. 1.

In some embodiments, the information is associated with the video in general, and in other embodiments, the information is associated with one or more time points in the video itself. FIG. 2 shows a general method for one embodiments of uploading information where the uploader and the artists or producer are separate and where the information is associated with the video in general. The first step (4) is receiving the video and any information or links from the artist or producer. The next step in this embodiment (5) is verifying the information or links to ensure accuracy. This involves ensuring that any hyperlinks are complete and send the individual to the correct web page, and that any information provided, such as concert dates, spelling of band member names, and any other information is correct. If there are errors in the information provided, the uploader can either correct this information or contact the artist or publisher to correct or clarify this information. After 5, the uploader can optionally search for or request additional information (6). For example, a producer may provide the social media accounts for band members. However, the producer may not provide any information relating to upcoming concerts and how one can purchase tickets to that event. Thus, in this optional step, the uploader could search for the band website and add that information, as well as links to upcoming concerts and ticketing purchasing links. After obtaining and verifying all information, the next step is deciding which category each piece of information belongs (7), followed by uploading the video and adding the information to the different categories, based on the separating made in the previous step (8).

As an example of the method embodiment shown in FIG. 2, a producer of a music video submits the video to the owner of the application, and gives the owner the names of all those involved in the production of the video, the social media pages of these individuals, information and links which allow a user to purchase the song, and information regarding upcoming shows and links which allow a user to purchase tickets to the show. The uploader takes all information provided and verifies that the spelling of the names are correct, the links work properly and send the user to the correct websites, and verifies the dates of the concerts. The uploader will then separate the information out into the different categories. For this video, the social media links for those involved in making the video will go under the "people" category, upcoming shows and links to ticket purchasing options will go under the "gigs" category, and links to where a user can purchase the song will go under the "music" category. After separating out, the uploader will upload the video and the information and links under the categories described above.

Figure 3:
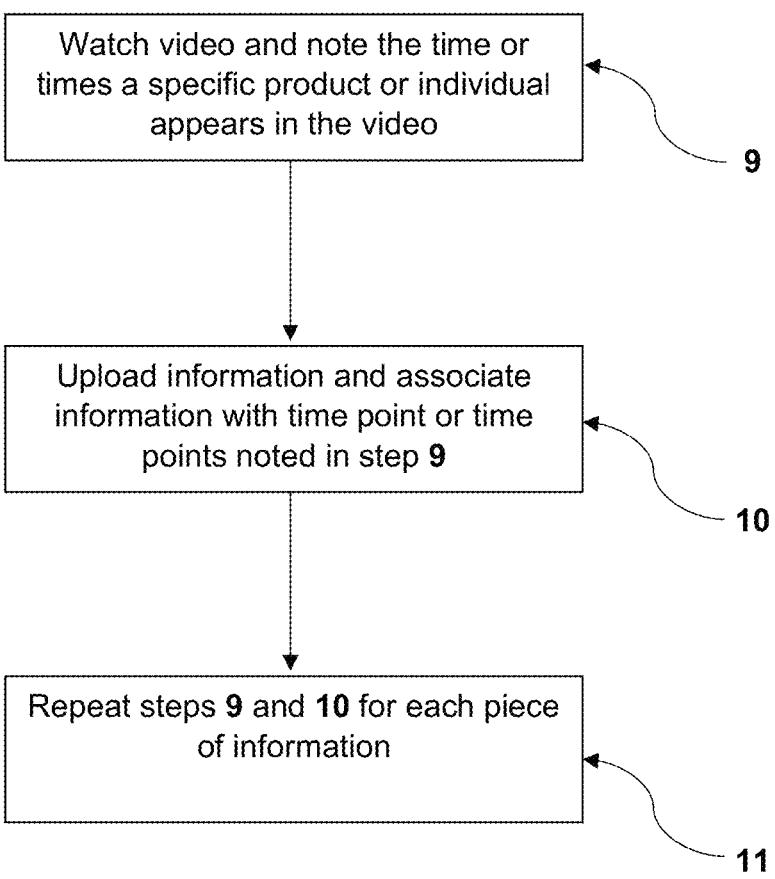
FIG. 3 shows a more detailed view of the second step of the method for analyzing videos shown in FIG. 1.

FIG. 3 shows a general method for how the uploader would upload information which is tied to one or more specific time points in a video, as opposed to the general video itself. This method generally falls under step 8 in FIG. 2. In some embodiments, step 9 is completed after uploading the video, and in other embodiments step 9 is completed before uploading the video. Step 9 comprises watching the video and noting when a product, individual, or other item associated with a piece of information appears in the video. This could be a single time point or multiple time points. For example, a music video may have been shot in multiple locations, which appear at one or more timepoints in the video. Location A may appear at the beginning, time point 0.00. Location A then appears again at time points 1.52 and 2.75. Location B appears only once at 0.34, and Location C at 2.01. In most embodiments, the timepoint associated with the item is when the item first appears. In other embodiments, the timepoint associated with the item is any time point when it is viewable on the screen. This is beneficial if there are multiple items on a screen at a given point in time. In some embodiments, the range of time an item is viewable in the video is noted, as opposed to one or more discreet time points. For example, Location A above could be associated with the time range of 0.00-0.34, 1.52-2.01, and 2.75-3.50.

After noting the time or times of a specific item, person, or other object associated with a piece of information, that information is uploaded and associated with the specific time point or time points noted in step 9. In some embodiments this involves tagging the specific time point and matching that tag with the information. In other embodiments this involves layering the information on top of the video in production.

After completing steps 9 and 10, these steps are repeated for each piece of information provided which is being linked to a video. This process causes the different items of information to be associated with different time points, and will allow these different items of information to pop-up or be highlighted in some way when that specific time point is passed while the user watches the video. In some embodiments where a piece of information is associated with more than one time stamp, only the first time stamp is associated with the item, in other embodiments all time stamps are associated, and in some embodiments only one time stamp, but not necessarily the first time stamp, as associated with the item.

In some embodiments, the items of information are associated both with specific time points and with the video as a whole. For example, the music video discussed above with the names of all those involved in the production of the video, the social media pages of these individuals, information and links which allow a user to purchase the song, information regarding upcoming shows, and links which allow a user to purchase tickets to the show could also have the different locations shown at the different time points discussed above. In this example, some of the information would be put under the different categories and not have any time stamps associated with them, such that they are associated with the video as a whole, while the different locations would be put under a "location" category with one or more time stamps associated with them.

In many embodiments at least one category will be a product, service, or other item which can be purchased from a third party. In many embodiments, the owner of the application will obtain a contract with the third party where a portion of the sale of the product, service, or other item is directed back to the owner of the application as a commission for directing the user of the application to the store. In some embodiments the brand, logo, or other information denoting the manufacturer or seller of the good is listed in the application.

Figure 4:
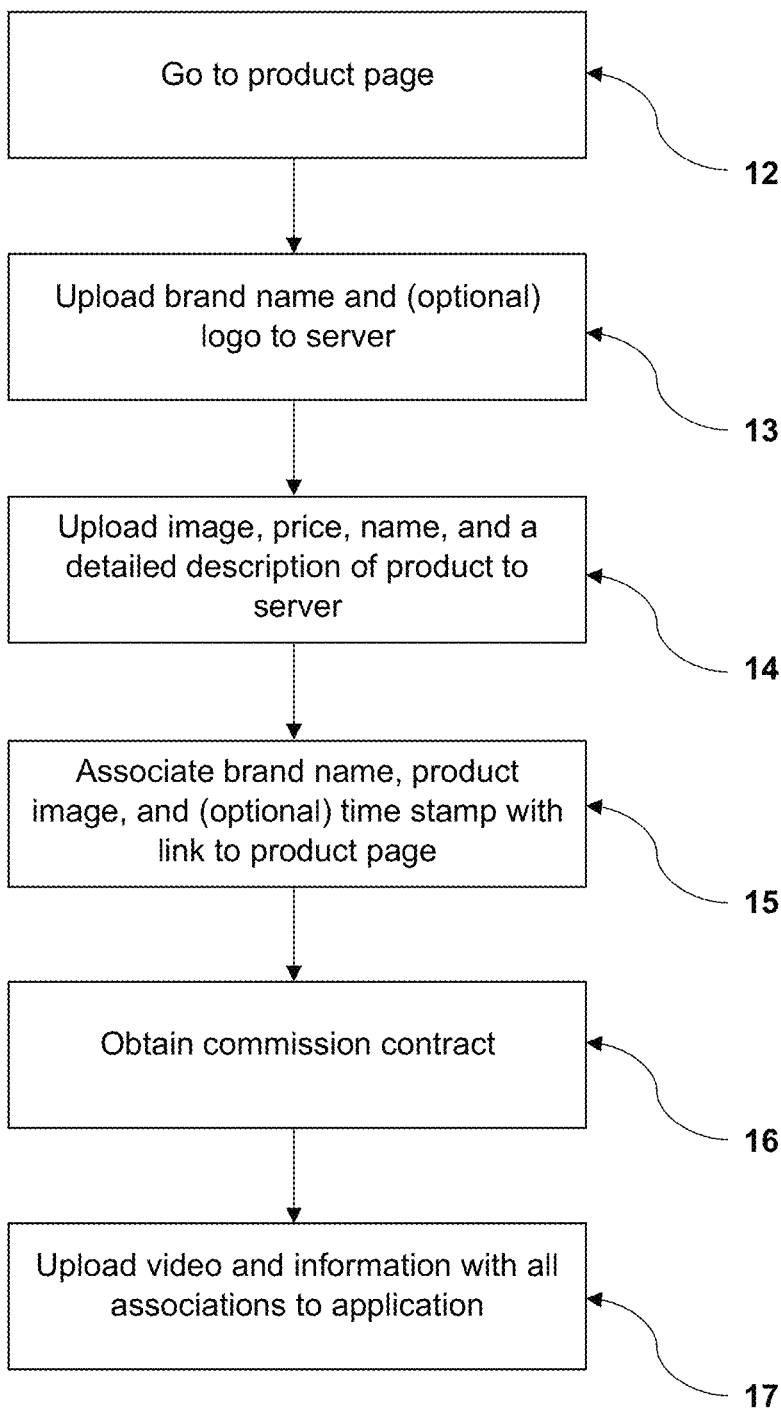
FIG. 4 shows a more detailed view of the second step of the method for analyzing videos shown in FIG. 1.

FIG. 4 shows an example flowchart for the method of preparing an item for sale through the application. First, the uploader would go to the product page which sells the product, service, or other item (12). This page or website in some embodiments is provided by the artist or producer of the video, and in other times it is searched for or obtained by the uploader. In some embodiments, step 12 is part of step 5, when the uploader validates the links and information provided for a specific product. From the product page, the brand name and logo (if the product has a logo) is extracted and uploaded to a server (13). In some embodiments, the server is the application's server, in other embodiments the server is a secondary sever which stores information and uploads it to the application's server. In other embodiments the server is the uploader's computer, laptop, tablet, mobile phone, or other device which stores information. The benefits of uploading the brand and logo to a server is that other items which are sold by the same brand can skip this step as this information is already stored. In some embodiments the logo is uploaded as a picture from a screen shot of the logo on the product page, in other embodiments the logo is obtained as a picture from the website, in others the logo is obtained as a picture from a search engine, and in others the logo is obtained from a picture from a trademark registry base. Once the associated brand has been uploaded, one or more images of the product are uploaded in a similar manner to the server (14) as well as the price, name, and a detailed description of the item. After all information has been uploaded, the website link, brand name and logo, and product image and any other information are associated with one another so that they can be uploaded to the application. In some embodiments the time stamps discussed above are associated in this step. After the information has been associated, if a contract with the selling company has not been established, a commission contract is obtained (16). In some embodiments, this step happens at the beginning, before any work is completed uploading or associating information. Once all of the above steps are complete, the video and associated information are saved on the server and uploaded to the application, as discussed above.

In most embodiments, all associated information and the functionality of the video and category tabs are tested before final upload to the application and subsequently tested after uploading to ensure proper functionality.

Figure 5:
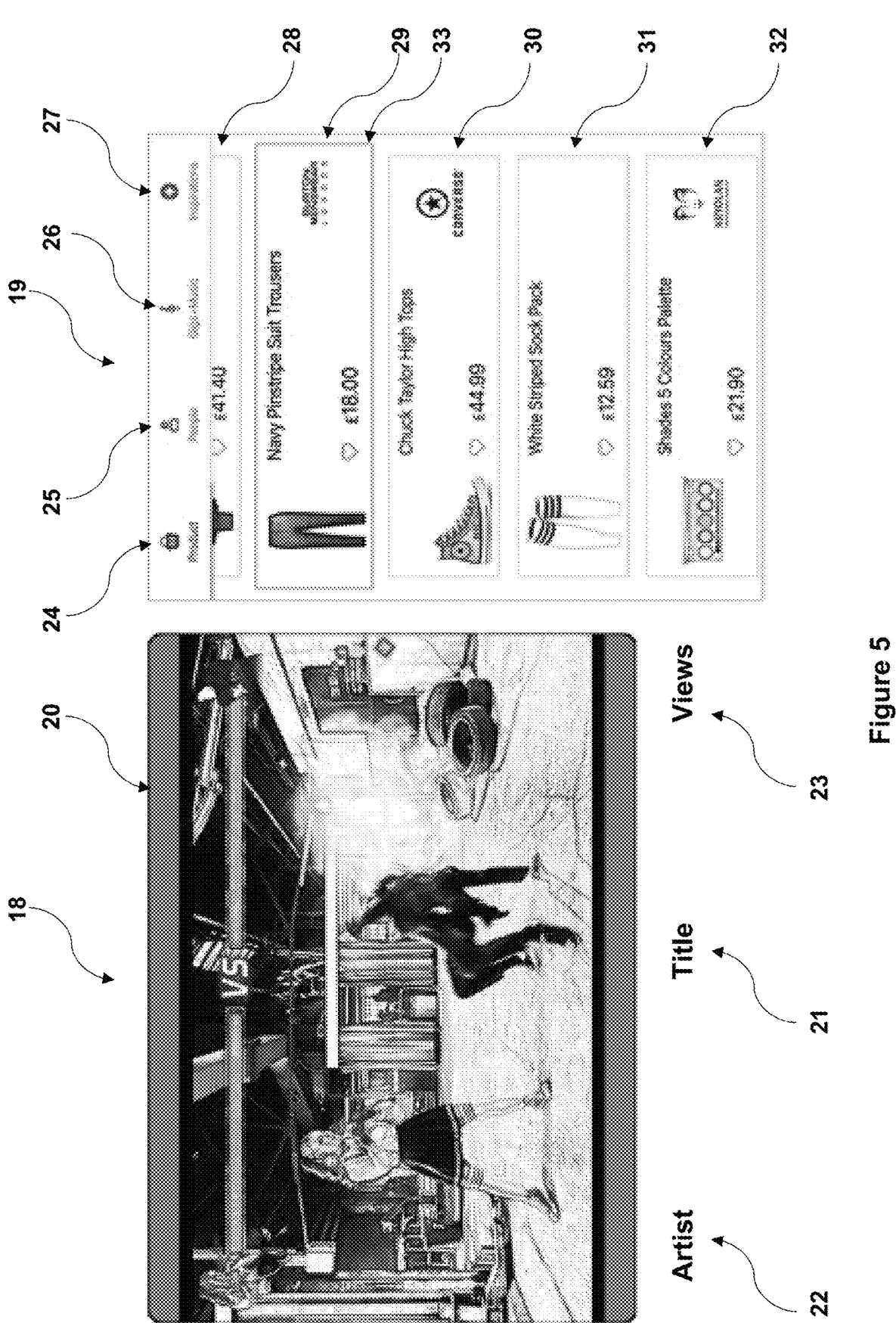
FIG. 5 shows the system for analyzing videos, which is made by the method shown in FIG. 1.
Figure 6:
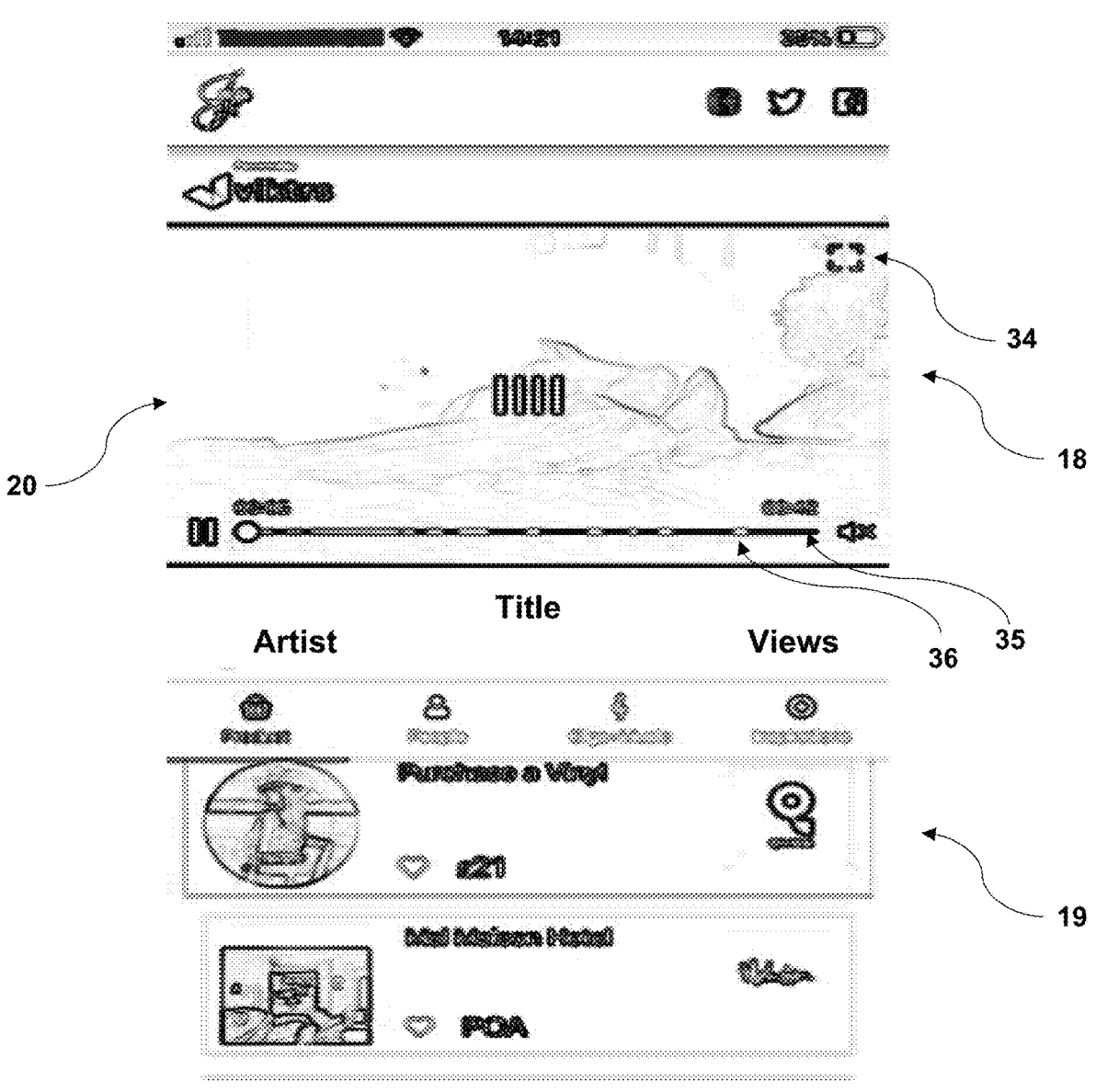
FIG. 6 shows an alternate view of the system for analyzing videos, which is made by the method shown in FIG. 1.

Turning now to the system and operation of the application, FIG. 5 shows an example embodiment of the application. In most embodiments, the application will display two main sections, the video section (18) and the categories or tabs section (19). In some embodiments, the different sections are side to side, as shown, and in others they are vertically aligned, with one on top of the other, as shown in FIG. 6. In some embodiments, video section 18 is on the left and tabs section 19 is on the right, as shown in FIG. 5, and in other embodiments the sections are switched, with video section 18 on the right and tabs section 19 being on the left. In some embodiments, users can choose the layout, as having the tabs section on one side or the other can benefit left or right-handed individuals who may hold a device with their non-dominant hand and interact with the device with their dominant hand. Having the tab section on the side of the dominant hand beneficially prevents the user's hand from covering video section 18 while interacting with tabs section 19. Likewise, in some embodiments tabs section 19 is under video section 18 and in other embodiments tabs section 19 is over video section 18.

In most embodiments, video section 18 comprises the video itself (20) as well as one or more pieces of information regarding the video. In many embodiments, video section 18 comprises the title of the video (21), the artist or producer of the video (22), and the number of views that video has received (23). In most embodiments, this information was uploaded and saved to the video in step 2, as discussed above.

In some embodiments video section 18 is viewable only in portrait mode, as shown in FIG. 6, where the length of the video is parallel to the length of the device screen. These embodiments are typically paired with the configuration shown in FIG. 6, with video section 18 over or under tabs section 19. These embodiments beneficially allow the most information to be shown on a screen while also still maximizing the size of the video, especially for smaller screens. In some embodiments video section 18 is visible only in landscape mode, as shown in FIG. 5, where the length of the video is parallel to the length of the device screen. These embodiments are typically paired with the configuration shown in FIG. 5, where video section 18 is to the left or right of tabs section 19. These configurations beneficially give the video its maximum screen size while also displaying the tabs section 19 and are often paired with larger screens. In most embodiments the user can choose which configuration they prefer, such that a user can choose between landscape or portrait mode.

Figure 7:
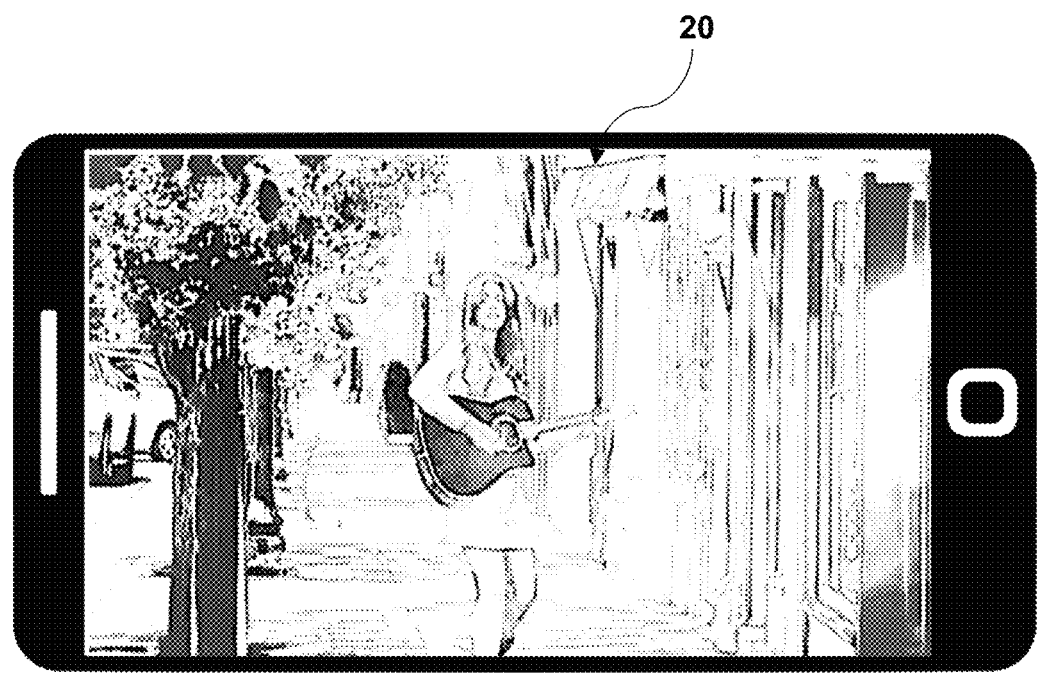
FIG. 7 shows a full screen view of the video which is analyzed by the method shown in FIG. 1.

In some embodiments at least a part of video section 18 and tabs section 19 are shown, but in some embodiments the user has the option of going "full-screen" with video 20, such that video 20 comprises the entire or a significant majority of the screen. In these embodiments, title 21, artist 22, views 23, and tabs section 19 are not shown. An example of this embodiment is shown in FIG. 7. In many embodiments, a user can make video 20 go full screen by pressing full screen button 34.

In most embodiments, video 20 is interacted with using standard functions including play, pause, skip, and volume. In some embodiments video 20 plays automatically when loaded, and in other embodiments video 20 will not play until instructed to by the user.

In most embodiments, tabs section 19 has one or more categories of items which relate to the categories determined using the different methods discussed above (steps 7 and 8, among others). In the embodiment shown in FIG. 5, the tabs section has four tabs, "products" (24), "people" (25), "Gigs+ Music" (26), and "Inspirations" (27). Each of these tabs lists the item or items that were associated with the category and uploaded with the video.

Shown in FIG. 5 is an embodiment where the items are synced with the video. The different products in the product tab (28-32) are listed in order of how they appear in the video. Currently, product 29 is being shown in the video, and thus is highlighted. In some embodiments, such as the one shown in FIG. 5, a highlighted product will have a bolded line 33 around the outside of the product, and will be larger than the other products, as a means of drawing attention to this product. As in most embodiments the products are shown in a general order of how they appear in the video, product 28 has already been shown in the video, as it is above the current product 29, and products 30-32 have yet to be shown in the video, as they are below current product 29. As discussed above, in some embodiments multiple items may appear at the same time. In this example at least products 29-31 are currently shown in the video, even though product 29 is the only one highlighted. Thus, in some embodiments the ordering of the items may not necessarily give an exact chronological ordering, but rather only a relative ordering. In some embodiments all items currently shown are highlighted, and in others only one item currently shown is highlighted.

In most embodiments the user is able to scroll through all items to see ones which may appear later in the video or may have already appeared. This process is completed without a disruption of the video and allows for a seamless viewing process. In some embodiments when a user stops manually scrolling the automatic scrolling and highlighting will continue. This beneficially allows the user to scroll to a specific item but once the user is not engaged with the item it shows the user the other items in the video as they appear as the user may be interested in a later item. In other embodiments once a user manually scrolls the automatic scrolling will be stopped permanently or until the video is refreshed. This beneficially allows a user to look at one or more items for a long period of time without fear of losing their place in the item list. In some embodiments the automatic highlighting will continue and the user will have to manually scroll through the list after each automatic highlighting. This beneficially allows the user to be constantly up to date with new items the user may be interested in purchasing or viewing.

In some embodiments video 20 will show the user when an item will be highlighted. In some embodiments time track 35 have indicators 36 which indicate that an item will be highlighted during that time point. In some embodiments indicators 36 are a different color time track portion and in others they are a different pattern.

Figure 8:
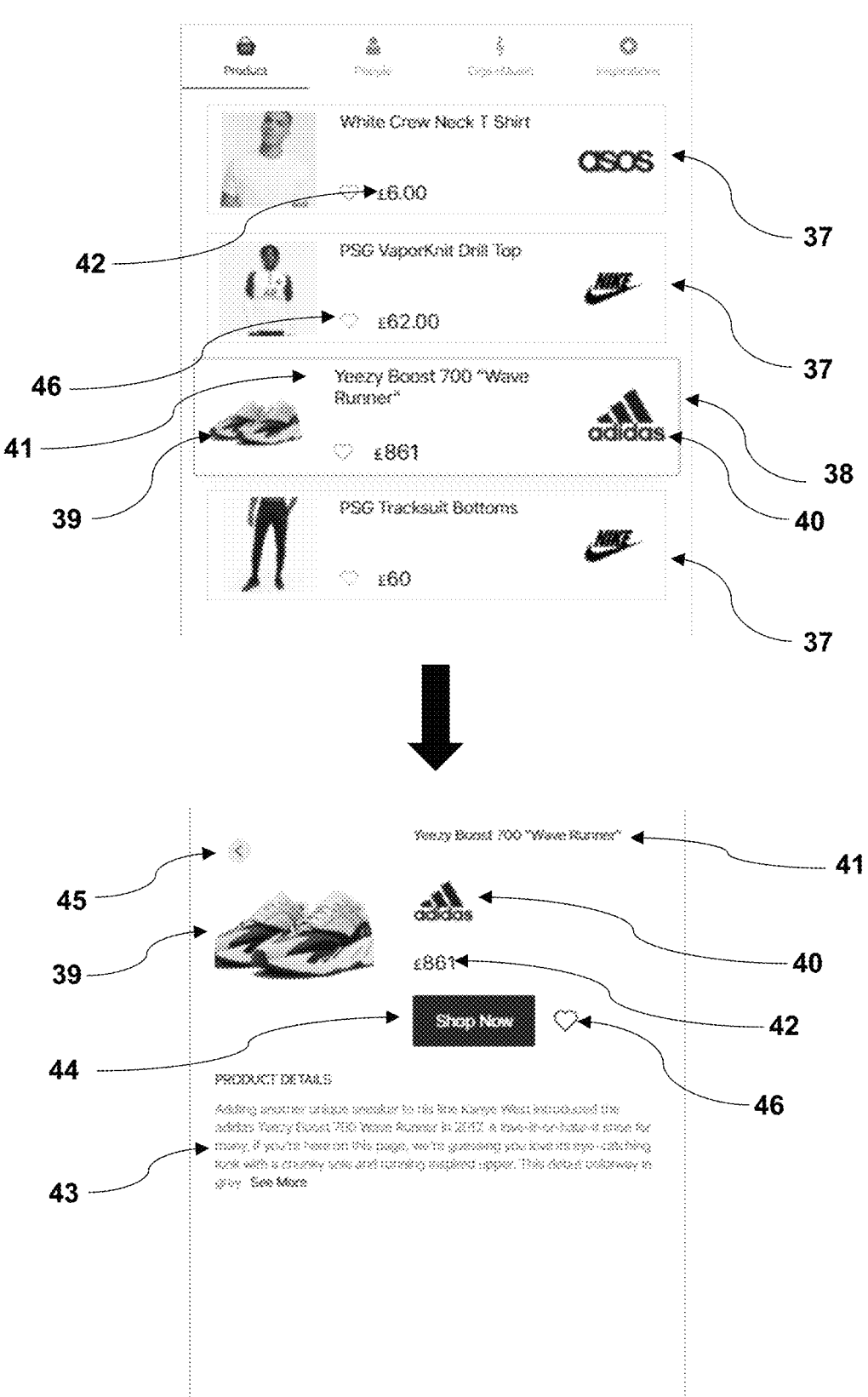
FIG. 8 shows a detailed look at purchasing items from the system for analyzing videos, which is made by the method shown in FIG. 1.

FIG. 8 shows how a user engages with items in a tab. The example shown in FIG. 8 shows an example of viewing and purchasing a product, but similar interactions occur when viewing a person's information, viewing location information, and the other categories discussed above. As discussed above, in most embodiments a tab will show one or more items 37 which a user can engage with. In the example shown in FIG. 8, product 38 is highlighted as it is currently shown in video 20. When in the list form, only select information about the item is shown. In the product embodiment shown in FIG. 8, the information comprises an image of the product (39), the brand name and/or logo of the seller of the product (40), the title or name of the product (41), and the price of the product (42). In some embodiments, no image of a product is available, and in these embodiments, a standard stock photo or a notification of no image is displayed as the product image. If a user is interested in viewing more information about a specific product, they can select on that product which maximizes the product to fill tabs section 19, as seen in the bottom of FIG. 8. This larger image still shows the information shown in the smaller tab (image 39, brand name 40, name 41 and price 42), but additionally includes additional details 43 and the ability to purchase the item (44). If the user is not interested in purchasing the item, they have the ability to save or favorite that item by clicking the favorite icon (46), which will store the item in their user account for later. Alternatively, they can click the back icon (45), which will take them back to the full product list. Users can also favorite items from the full product list by clicking favorite icon 46 there as well. In some embodiments, the user has the ability to save all items which are currently shown in video 20.

In some embodiments, when a user clicks purchase icon 44, the user will be directed to an external $3^{rd}$ party website to purchase the item. In most embodiments, the external website will have an HTML tag or other similar code which denotes that the user came from the application, which helps the $3^{rd}$ party track traffic from the application as well as amount of proceeds which need to be sent back to the application owner, per the contract terms. In other embodiments, the user is able to purchase the item without leaving the application. In some embodiment this in-application purchasing is completed using blockchain technology. These embodiments beneficially allow a user to interact with and purchase an item while not disrupting the video watching experience.

Figure 9:
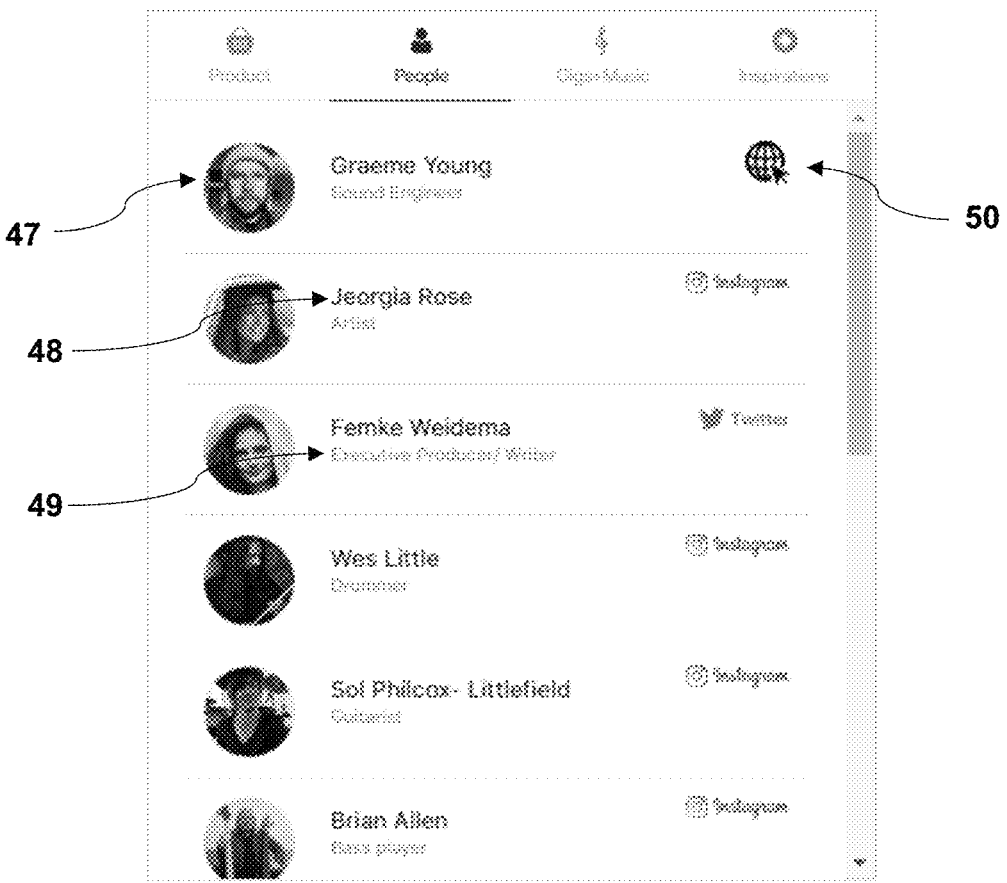
FIG. 9 shows a detailed look at another tab in the system for analyzing videos, which is made by the method shown in FIG. 1.

FIG. 9 shows an example embodiment of the "people" tab. In some embodiments the people are synced with the playing of the video and are highlighted as they appear, but in most embodiments the people are not synced with the video. In most embodiments each individual has multiple items associated with them, including their photo (47), name (48), occupation or roll in video (49), and one or more associated websites social media sites or apps (50). In most embodiments, when a user clicks on an individual, they are directed to the $3^{rd}$ party website associated with that individual. In many embodiments the website is a social media website or a business website.

Figure 10:
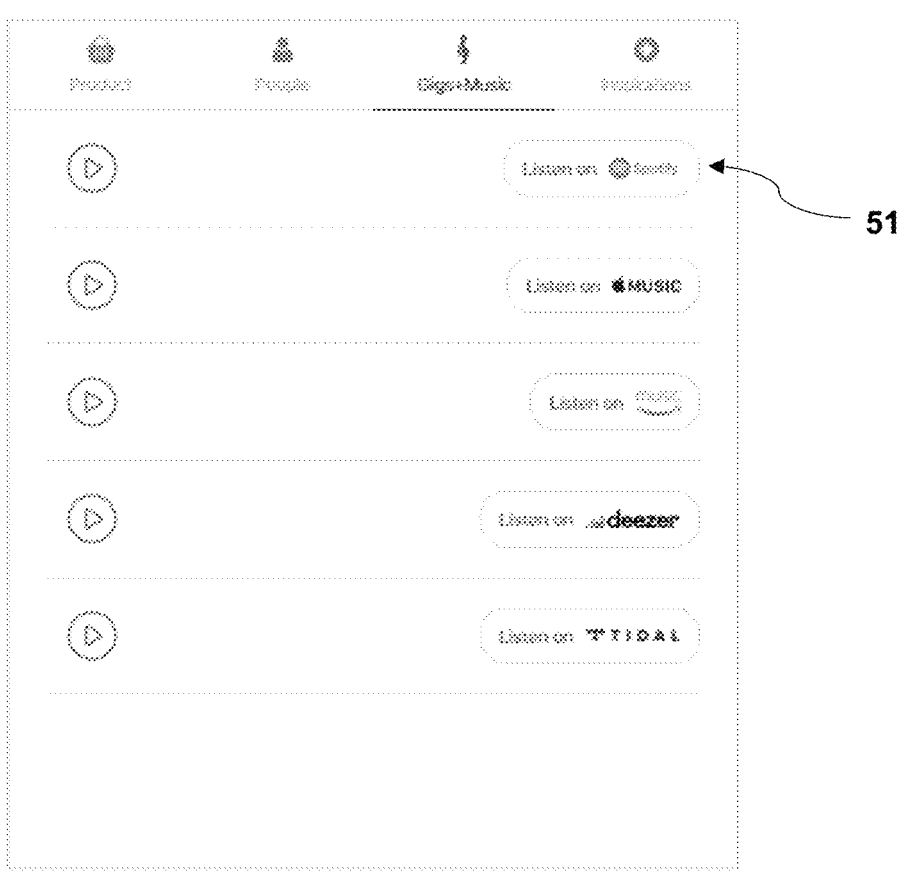
FIG. 10 shows a detailed look at another tab in the system for analyzing videos, which is made by the method shown in FIG. 1.

FIG. 10 shows an example embodiment of the "Gigs+ Music" tab. In most embodiments this tab lists different websites where a user can purchase that song or listen to related music by that artist or producer. Additionally, in most embodiments upcoming music festivals, shows, or other events are listed where a user can purchase tickets to those events. In most embodiments the purchasing of items is completed as described above for the purchasing of products. In most embodiments, when a user clicks on a specific music platform (51) the user will be directed to the $3^{rd}$ party website or application. In other embodiments, the 3$^{rd}$ party website is able to be accessed directly through the application.

Figure 11:
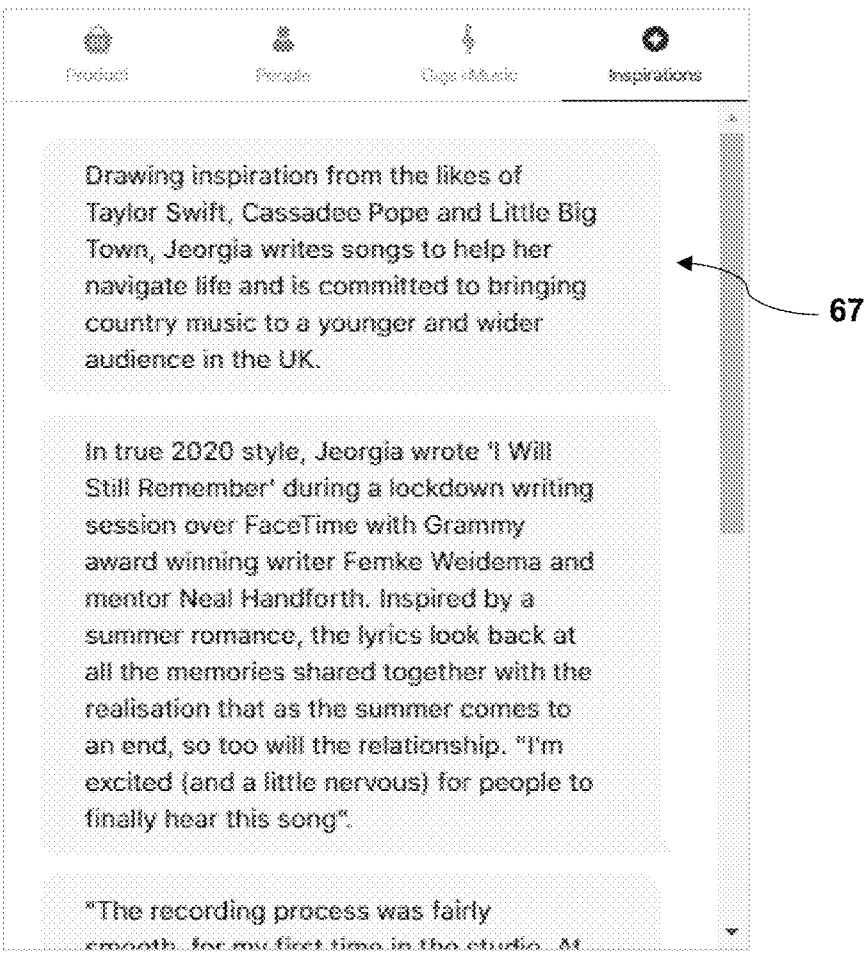
FIG. 11 shows a detailed look at another tab in the system for analyzing videos, which is made by the method shown in FIG. 1.

FIG. 11 shows an example of the "Inspirations" tab. In most embodiments this tab lists stories or inspirations which prompted the artist to make the particular song or video (67). In many embodiments this tab will list multiple individuals and have inspirations for each individual, and in other tabs only a single individual's inspirations will be present. In some embodiments, the inspirations tab comprises one or more links to alternate websites. These websites can be charitable organizations which inspired the artist, the webpage of someone or something which inspired the artist, or other websites which the artist wants users to be able to engage with.

In most embodiments, all interacting with the tabs section 19 occurs without interruption of the ability of the user to watch video 20. In some embodiments, when a user is directed to a 3$^{rd}$ party website, that website will open in a new website tab and the main website tab with video 20 will continue as the active tab to avoid interruptions in the video.

In most embodiments, when a user opens a video, all the information associated with the video is uploaded initially to the website or application from the server to avoid back and forth communication between the application and the server. This beneficially reduces delays, and allows a user to load a video while on a non-metered connection and watch the video and interact with the tabs later when on a metered connection.

In some embodiments the users have the ability to share the video, or any item, experience, or charity, associated with the video with others. This sharing can be completed via email, social media platforms, RSS feeds, or other similar methods. In some embodiments the application has the option of voice activation, searching, and other features. In many embodiments this voice activation and control is completed using W3C Standards for the visually or physically impaired. In some embodiments the user can personalize the color, style, or layout of the application.

In the embodiments a user can comment on a video or on other comments which have previously been made on that video.

In some embodiments the user can subscribe to the artist who submitted the video which will alert the user of subsequent videos submitted by the artist. In other embodiments the user can subscribe to any item, experience, or charity associated with the video in order to be updated on specials, sales, new items, subscriber exclusives, or any other type of communication from the companies or individuals.

In other embodiments the user can subscribe to the application. In many embodiments subscribing to the application gives the user benefits. These benefits include, but are not limited to, access to exclusive content or special features, sneak previews, early access to content or items, personalized recommendations or ads, discounts, promotions, access to reward programs, ability to link the application with social media platforms, exclusive access to artists or producers, and chat, review, voting, and other community interaction features.

In many embodiments, when a user subscribes or makes an account associated with to the application, this benefits the owner of the application as well. The videos a user watches, the items a user selects and purchases, and other data collection can be more accurately complied and sold to third-parties.

In most embodiments, whether or not a user has an account, data will be collected based on the different interactions a user has with the video. In most embodiments this data is collected in real time and stored on a server such that the application owner can engage with and view this data. In some embodiments, users are able to view and analyze the data collected. As above, in many embodiments the data is sold to third-parties, used to determine contracts, artist deals, brand placements, or other marketing options.

Figure 14:
FIG. 14 shows a way to view the effectiveness of the system for analyzing videos, which is made by the method shown in FIG. 1.

Examples of data which in some embodiments are collected is number of views a video receives. In some embodiments the video must be watched until the end of the video to be counted, and in other embodiments only a set amount of time needs to be watched for the application to count that interaction as a view. Another example is the number of interactions (or clicks) a specific tab gets, as well as the items within each tab. In some embodiments, the amount of time a user looks at a specific item or is on a specific page is monitored. In other embodiments, the IP data is collected as a means of logging unique versus repeat users, the location of the user, and other important information. In some embodiments, the data is collected and able to be viewed on a dashboard, such as the one shown in FIG. 14.

Figure 12:
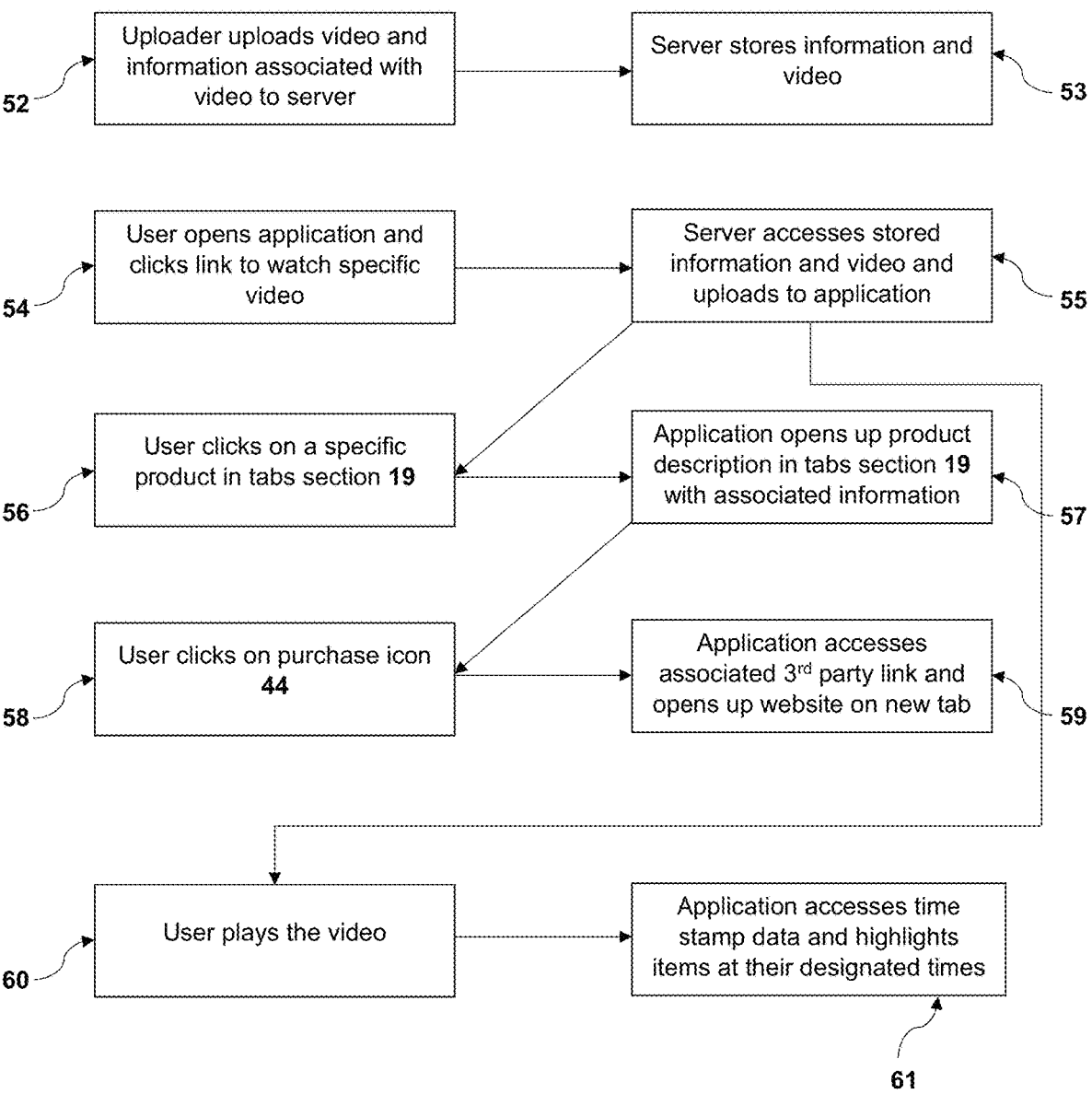
FIG. 12 shows a detailed look at how a user engages with the system for analyzing videos, which is made by the method shown in FIG. 1.

FIG. 12 shows a how the users and server or application interact with one another. On the left side is prompts a user or uploader gives to the server or application, and on the right is the response by the server or application. As shown, in most embodiment when the uploader uploads information associated with the video (52) that information is stored on the server for later use and access by a user.

In some embodiments the user will open the application and have a variety of videos to watch. In some embodiments, such as when the application is embedded on a webpage, the user only has the video accessible on that single page. In all embodiment, the user will engage with a specific video (54). When this happens, the application accesses the server, which in turn uploads all information related to the video to the application (55). As discussed above, this beneficially prevents lag time when moving between tabs or when accessing diverse information.

Once loaded, the user can engage with the video in a variety of ways. The user could play or watch the video (60). In embodiments where there are products associated with the time stamp data, the application will use this information to highlight the products or items at the specified time stamps (61) as discussed above. Alternatively, or in combination, the user can engage with a specific tab. The example shown in FIG. 12 uses the example of engaging with the product tab. When a user clicks on a specific product in the product tab (56) the application will open up the product description with the full information (57), as shown in FIG. 8. The user can either go back, which would bring the user back to the tab section 19, or can click on the purchase icon (58). If the user selects the purchase icon, the application accesses the associated 3$^{rd}$ party link where the product is sold and opens up a new tab with that website (59). As discussed above, in some embodiments BlockChain technology is used such that the application will allow the user to purchase the item within the tab itself, and will not need to open another separate web page.

While the present invention has been particularly described, it is evident that many alternatives, modifications and variations will be apparent to those skilled in the art in light of the foregoing description. These descriptions and drawings are exemplary of specific embodiments only and are not intended to be limiting to the scope of the invention defined in the claims. It is therefore contemplated that the claims will embrace any such alternatives, modifications, and variations as falling within the true scope and spirit of the present invention.

What is claimed:

1. A method for analyzing videos, comprising the steps of:
obtaining a video;
obtaining information on multiple items in said video that are available for purchase;
associating a time point in said video with each of said multiple items;
displaying said video in a video section and at least three navigation user interface elements simultaneously in a tabs section, said navigation user interface elements corresponding to respective tabs, each tab containing information about said video;
displaying a category label on each of said navigation user interface elements;
displaying a first set of at least two items simultaneously in said video;
displaying said first set of at least two items simultaneously in one of said at least three tabs;
manually scrolling the tab with a scrolling input to exclusively display a second set of one or more items that appear at a different time in the video, relative to the current playback time;
advancing the video to a time when a third set of one or more items are displayed in the video;
automatically scrolling the tab to the corresponding third set of one or more items;
automatically highlighting information on at least one of the items in the third set of items by displaying at least one item from the third set of items with a bold border and a larger size;
filling up said tabs section by displaying additional information on one of said multiple items; and
verifying said information on said multiple items in said video.

2. The method for analyzing videos according to claim 1, wherein the step of obtaining information on said one of said at least two items comprises the steps of:
obtaining a web link where said one of said at least two items is sold;
obtaining a name for said one of said at least two items;
obtaining a brand name of a company that sells said one of said at least two items;
obtaining a price for said one of said at least two items;
obtaining an image of said one of said at least two items;
obtaining a description of said one of said at least two items;
associating said web link, said name, said brand name, said price, said description,
and said image of said one of said at least two items with one of said at least two items.

3. The method for analyzing videos according to claim 2, wherein the step of displaying said one of said at least two items comprises displaying said name, said brand name, said price, and said image of said one of said at least two items.

4. The method for analyzing videos according to claim 3, wherein the step of displaying additional information about said one of said at least two items is performed in response to when said user engages with said one of said at least two items.

5. The method for analyzing videos according to claim 4, further comprising the step of displaying a button, which when engaged by said user opens up said web link where said one of said at least two items is sold.

6. The method for analyzing videos according to claim 1, wherein when additional information about said one of said at least two items is displayed, said video is not stopped from playing.

7. The method for analyzing videos according to claim 1, further comprising the step of obtaining one or more websites associated with at least one individual involved in the creation of the video and associating said one or more websites with said video.

8. The method for analyzing videos according to claim 1, further comprising the step of obtaining information about upcoming events hosted by at least one individual involved in the creation of the video and associating said information about upcoming events with said video.

9. The method for analyzing videos according to claim 1, wherein the step of obtaining said video further comprises uploading said video using a third-party system for video playing and hosting.

10. The method for analyzing videos according to claim 1 wherein the step of associating a time point in said video with said one of said at least two items further comprises the step of watching said video and noting said time points when said one of said at least two items appears in said video.

11. The method for analyzing videos according to claim 10 wherein the step of associating a time point in said video with said one of said at least two items further comprises the step of uploading said information of said one of said at least two items with said time point.

12. The method for analyzing videos according to claim 11, wherein the step of associating a time point in said video with said one of said at least two items further comprises the step of repeating said step of associating a time point in said video with said one of said at least two items for each piece of said information.

13. The method for analyzing videos according to claim 1, further comprising the step of collecting data from said user that interacts with said video.

14. The method for analyzing videos according to claim 13, further comprising the step of storing said data on a server.

15. A method for analyzing videos, comprising the steps of:
uploading information about multiple products;
uploading information about at least one person;
uploading information about a concert and an album of said at least one person;
displaying a tabs section comprising at least three tabs wherein one of said at least three tabs is a products tab, one of said at least three tabs is a people tab, and one of said at least three tabs is a gigs and music tab;
labeling said at least three tabs so that labels of said at least three tabs are simultaneously displayed;
displaying a video section comprising said multiple products and said at least one person;
enabling a user to select one of said at least three tabs;
displaying information about a first set of one or more products simultaneously when said first set of one or more products appears in said video section and said user selects said products tab;
manually scrolling the products tab with a scrolling input to exclusively display a second set of one or more products that appear at a different time in the video, relative to the current playback time;
advancing the video to a time when a third set of one or more products are displayed in the video;
automatically scrolling the products tab to the corresponding third set of one or more products;

automatically highlighting information on at least one of the products in the third set of products by displaying at least one product from the third set of products with a bold border and a larger size;

filling up said tabs section by displaying additional information on-said at least one product;

displaying said information about at least one person simultaneously when said at least one person appears in said video section and said user selects said people tab;

displaying said information about said at least one person's said concert and said album simultaneously when said at least one person appears in said video section and said user selects said gigs and music tab; and enabling a user to purchase at least one product displayed in said products tab, and said concert's tickets and said album displayed in said gigs and music tab.

16. The method for analyzing videos according to claim 15, further comprising the steps of providing a favorite icon and enabling a user to save said at least one product by clicking said favorite icon.

17. The method for analyzing videos according to claim 15, further comprising the step of enabling a user to save said at least one product currently shown in said video section.

18. The method for analyzing videos according to claim 15, wherein said user is enabled to complete purchasing said at least one product within an application running said method.

19. A method for analyzing videos, comprising the steps of:

providing a tabs section;

providing a video section, wherein said tabs section and said video section are separate sections on a screen;

providing at least four tabs in said tabs section, wherein one of said at least four tabs is an inspiration tab;

playing a video in said video section with multiple items shown throughout said video at different time intervals;

providing information on inspirations related to said video in said inspiration tab;

displaying a first set of at least two items simultaneously in said video;

displaying said first set of at least two items simultaneously in one of said at least four tabs except said inspiration tab;

manually scrolling the tab with a scrolling input to exclusively display a second set of one or more items that appear at a different time in the video, relative to the current playback time;

advancing the video to a time when a third set of one or more items are displayed in the video;

automatically scrolling the tab to the corresponding third set of one or more items;

automatically highlighting information on at least one of the items in the third set of items by displaying at least one item from the third set of items with a bold border and a larger size;

collecting data on the user of the application's interactions with the videos said user watches, the items said user selects and purchases, and the amount of time said user looks at said items; and generating graphs and data tables with said data on user.

*  *  *  *  *